(12) United States Patent
Kim et al.

(10) Patent No.: US 9,264,153 B2
(45) Date of Patent: Feb. 16, 2016

(54) METHOD AND APPARATUS FOR CANCELLING SELF-INTERFERENCE SIGNAL BETWEEN TRANSMISSION ANTENNA AND RECEPTION ANTENNA

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/565,736

(22) Filed: Dec. 10, 2014

(65) Prior Publication Data

US 2015/0311985 A1  Oct. 29, 2015

Related U.S. Application Data

(60) Provisional application No. 61/984,842, filed on Apr. 27, 2014.

(51) Int. Cl.
| | |
|---|---|
| *H04B 7/02* | (2006.01) |
| *H04B 15/00* | (2006.01) |
| *H04B 7/24* | (2006.01) |
| *H04B 7/06* | (2006.01) |

(52) U.S. Cl.
CPC ............ *H04B 15/00* (2013.01); *H04B 7/026* (2013.01); *H04B 7/0626* (2013.01); *H04B 7/24* (2013.01)

(58) Field of Classification Search
CPC .............................. H04B 7/0626; H04B 7/026
USPC ............ 455/83, 570, 67.13, 67.11, 63.1, 501
See application file for complete search history.

(56) References Cited

U.S. PATENT DOCUMENTS

| | | | | |
|---|---|---|---|---|
| 2008/0089397 | A1* | 4/2008 | Vetter | H04L 27/366 375/220 |
| 2012/0224610 | A1* | 9/2012 | Baldemair | H04B 7/15585 375/211 |
| 2013/0301487 | A1* | 11/2013 | Khandani | H04W 16/14 370/278 |
| 2015/0188646 | A1* | 7/2015 | Bharadia | H04B 15/00 370/278 |

\* cited by examiner

*Primary Examiner* — John J Lee
(74) *Attorney, Agent, or Firm* — Dentons US LLP

(57) ABSTRACT

An apparatus for cancelling a self-interference signal between a transmission antenna and a reception antenna is disclosed. The apparatus includes a first self-interference signal cancellation unit for cancelling a self-interference signal in consideration of a linear channel between the transmission antenna and the reception antenna, a second self-interference signal cancellation unit for cancelling a self-interference signal in consideration of nonlinear channel characteristic between the transmission antenna and the reception antenna or linear characteristic of a radio channel, and a controller for comparing a transmitted signal output from the transmission antenna and a received signal received by the reception antenna to provide a first coefficient to be applied to self-interference signal cancellation of a linear device in the first self-interference signal cancellation unit and a second coefficient to be applied to self-interference signal cancellation of a nonlinear device in the second self-interference signal cancellation unit.

8 Claims, 13 Drawing Sheets before ADC after ADC after digital cancellation and scaling (Wide band)   (Narrow band)

1

METHOD AND APPARATUS FOR CANCELLING SELF-INTERFERENCE SIGNAL BETWEEN TRANSMISSION ANTENNA AND RECEPTION ANTENNA

Pursuant to 35 U.S.C. §119(e), this application claims the benefit of U.S. Provisional Application No. 61/984,842, filed on Apr. 27, 2014, which is hereby incorporated by reference as if fully set forth herein.

BACKGROUND OF THE INVENTION

1. Field of the Invention

The present invention relates to wireless communication, and more particularly, to a method and apparatus for cancelling a self-interference signal between a transmission (Tx) antenna and a reception (Rx) antenna.

2. Discussion of the Related Art

A full duplex radio (FDR) or full duplex communication scheme refers to a communication scheme for simultaneously supporting transmission and reception using the same resource in one user equipment (UE). In this case, the same resource refers to the same time and the same frequency. FDR communication or full duplex communication is referred to as two-way communication.

FIG. 1 is a diagram illustrating concept of a UE and a base station (BS), which support FDR. Referring to FIG. 1, in a network state that supports FDR, there are three types of interferences. First interference is intra-device self-interference. The intra-device self-interference refers to interference caused by signals that are transmitted from a transmission (Tx) antenna and received by a receiving (Rx) antenna in one BS or UE. Since the signals transmitted from the Tx antenna are transmitted with high power and a distance between the Tx antenna and the Rx antenna is small, the transmitted signals are received by the Rx antenna while attenuation is barely caused, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by an adjacently positioned UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, a most serious problem is cancellation of self-interference. However, methods for effectively cancelling self-interference in an FDR state have not been discussed in detail.

SUMMARY OF THE INVENTION

An object of the present invention is to provide an apparatus for cancelling a self-interference signal between a transmission (Tx) antenna and a reception (Rx) antenna.

Another object of the present invention is to provide a method for cancelling a self-interference signal between a Tx antenna and a Rx antenna.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for cancelling a self-interference signal between a transmission antenna and a reception antenna includes a first self-interference signal cancellation unit for cancelling a self-interference signal in consideration of a linear channel between the transmission antenna and the reception antenna, a second self-interference signal cancellation unit for cancelling a self-interference signal in consideration of nonlinear channel characteristic or linear characteristic of a radio channel between the transmission antenna and the reception antenna, and a controller for comparing a transmitted signal output from the transmission antenna and a received signal received by the reception antenna to provide a first coefficient to be applied to self-interference signal cancellation of a linear element in the first self-interference signal cancellation unit and a second coefficient to be applied to self-interference signal cancellation of a nonlinear element in the second self-interference signal cancellation unit. The second self-interference signal cancellation unit may cancel a self-interference signal of a nonlinear element using the second coefficient. The first self-interference signal cancellation unit may cancel a linear self-interference signal in consideration of time taken to receive the transmitted signal by the reception antenna using the first coefficient. The first self-interference signal cancellation unit and the second self-interference signal cancellation unit may be configured in series between a receiver including the transmission antenna and a receiver including the reception antenna. The controller may be configured between the transmission antenna and the reception antenna. The controller, the first self-interference signal cancellation unit, and the second self-interference signal cancellation unit may be connected and configured in series between a node between a band pass filter and a transmission antenna at a transmitter and a node between a band pass filter and a reception antenna at a receiver.

In another aspect of the present invention, a method for cancelling a self-interference signal between a transmission antenna and a reception antenna includes comparing a transmitted signal output from the transmission antenna and a received signal received by the reception antenna to provide a first coefficient to be applied to self-interference signal cancellation of a linear element and a second coefficient to be applied to self-interference signal cancellation of a nonlinear element, cancelling a linear self-interference signal using the first coefficient, and cancelling a nonlinear self-interference signal using the second coefficient. The cancelling of the linear self-interference signal may include cancelling a self-interference signal in consideration of time taken to receive the transmitted signal by the reception antenna using the first coefficient.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows an example in which an interference signal has lower power than a desired signal and the desired signal is recovered after the interference signal is cancelled;

DETAILED DESCRIPTION OF THE INVENTION

Figure 1:
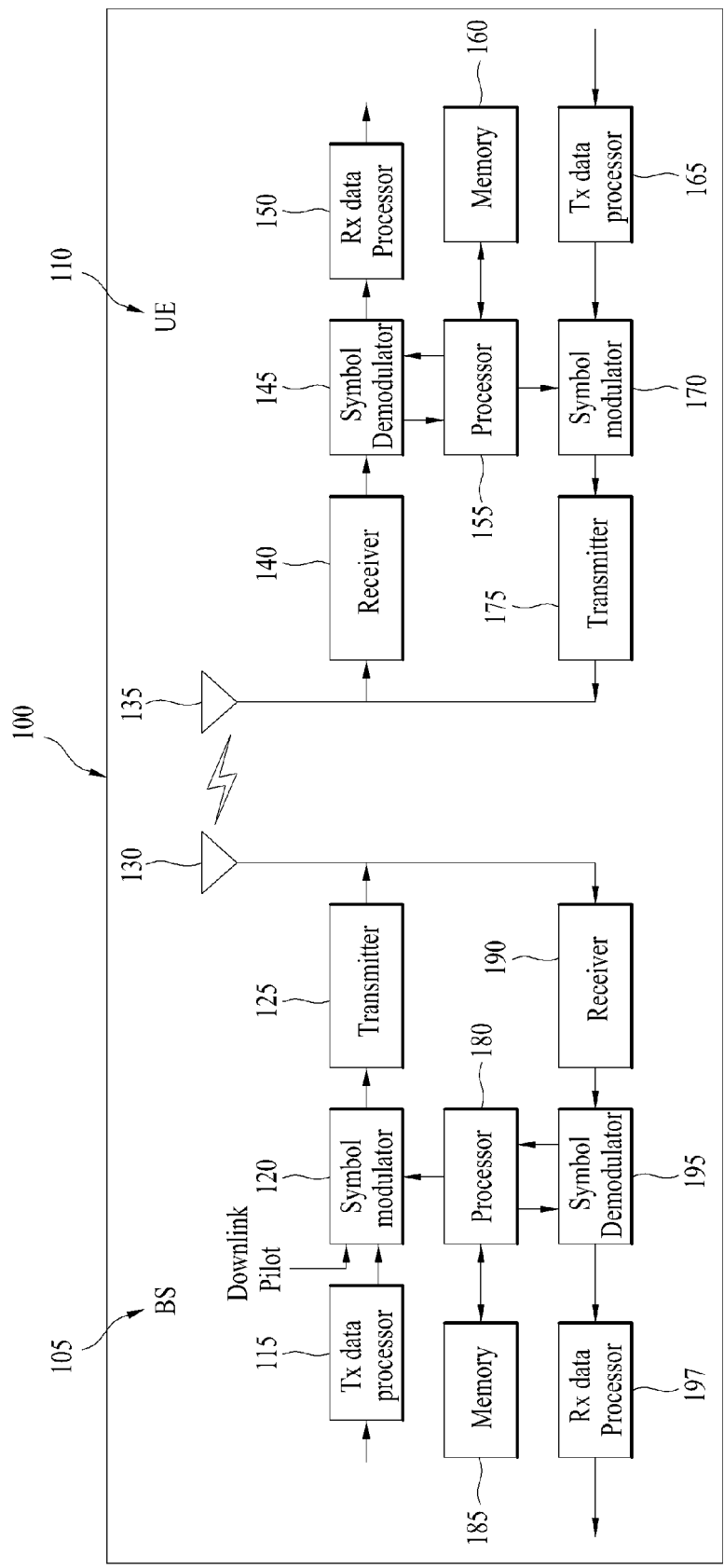
FIG. 1 is a diagram illustrating concept of a user equipment (UE) and a base station (BS), which support full duplex radio (FDR)

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, access point (AP), etc. Throughout this specification, the technical features of the present invention are described based on an institute of electrical and electronic engineers (IEEE) 802.16 system, but may be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

Figure 2:
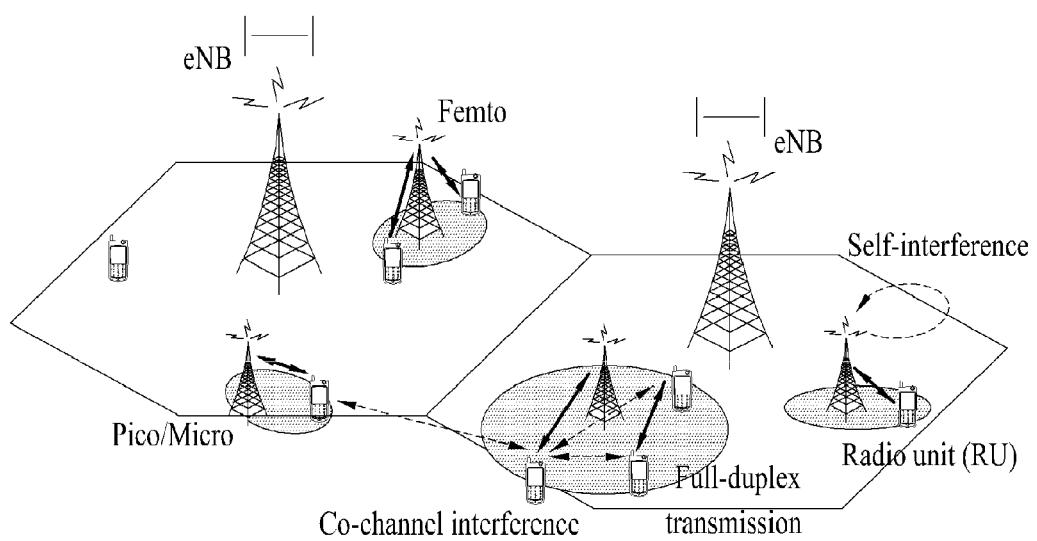
FIG. 2 is a block diagram illustrating a structure of BS and a UE 110 in a wireless communication system.

FIG. 2 is a block diagram illustrating a structure of a base station (BS) 105 and a user equipment (UE) 110 in a wireless communication system 100.

Although one BS 105 and one UE 110 (including a D2D UE) are illustrated in order to simply illustrating the wireless communication system 100, the wireless communication system 100 may include one or more BSs and/or one or more UEs.

Referring to FIG. 2, the BS 105 may include a transmission (Tx) data processor 115, a symbol modulator 120, a transmitter 125, a Tx/Rx antenna 130, a processor 180, a memory 185, a receiver 190, a symbol demodulator 195, and a reception (Rx) data processor 197. In addition, the UE 110 may include a Tx data processor 165, a symbol demodulator 170, a transmitter 175, a Tx/Rx antenna 135, a processor 155, a memory 160, a receiver 140, a symbol demodulator 145, and an Rx data processor 150. Although FIG. 2 illustrates that each of the BS 105 and the UE 110 includes the Tx/Rx antennas 130 and 135, respectively, each the BS 105 and the UE 110 includes a plurality of Tx/Rx antennas. Accordingly, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO) schemes.

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of symbols.

The symbol modulator 120 multiplexes the data and pilot symbols and transmits the multiplexed data and pilot symbols to the transmitter 125. In this case, each transmitted symbol may be a data symbol, a pilot symbol, or a zero signal value. In each symbol period, pilot symbols may be consecutively transmitted. The pilot symbols may each be a frequency division multiplexing (FDM) symbol, an orthogonal frequency division multiplexing (OFDM) symbol, a time division multiplexing (TDM) symbol, or a code division multiplexing (CDM) symbol.

The transmitter 125 receives the stream of symbols, converts the stream into one or more analog signals, and further adjusts (e.g., amplifies, filters, and frequency-upconverts) the analog signals to generate a downlink signal appropriate for transmission via a radio channel. Then the Tx antenna 130 transmits the generated downlink signal to the UE 110.

In the structure of the UE 110, the Rx antenna 135 receives the downlink signal from the BS 105 and provides the received signal to the receiver 140. The receiver 140 adjusts (e.g., filters, amplifies, and frequency-downconverts) the received signal and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquires data symbol estimated values (which is estimated values of the transmitted data symbols), and provides the data symbol estimated values to the Rx data processor 150. The Rx data processor 150 demodulates (i.e., symbol-demaps), deinterleaves, and decodes the data symbol estimated values to recover the transmitted traffic data.

Processing operations by the symbol demodulator 145 and the Rx data processor 150 are complementary to processing operations of the symbol modulator 120 and the Tx data processor 115 in the BS 105, respectively.

In uplink, the Tx data processor 165 of the UE 110 processes traffic data to provide data symbols. The symbol demodulator 170 may receive and modulate the data symbols and provide a stream of the symbols to the transmitter 175. The transmitter 175 receives and processes the stream of symbols to generate an uplink signal. In addition, the Rx antenna 135 transmits the generate uplink signal to the BS 105.

In the BS 105, an uplink signal from the UE 110 is received by the Rx antenna 130, and the receiver 190 processes the received uplink signal to acquire samples. Then the symbol demodulator 195 processes the samples to provide pilot symbols and data symbol estimated values which are received for downlink. The reception (Rx) data processor 197 processes the data symbol estimated values to recover the traffic data transmitted from the UE 110.

The processors 155 and 180 of the UE 110 and the BS 105 order (e.g., controls, manipulates, manages, etc.) operations of the UE 110 and the BS 105, respectively. The processors 155 and 180 may be respectively connected to the memories 160 and 185 which store program codes and data. The memories 160 and 185 are respectively connected to the processors 155 and 180 and store an operating system, application, and general files.

The processors 155 and 180 may be referred to as a controller, a microcontroller, a microprocessor, a microcomputer, or the like. The processors 155 and 180 may each be embodied by hardware, firmware, software, or a combination thereof. When an embodiment of the present invention is embodied by hardware, the processors 155 and 180 may include application specific integrated circuits (ASICs), digital signal processors (DSPs), digital signal processing devices (DSPDs), programmable logic devices (PLDs), field programmable gate arrays (FPGAs), or the like which is configured to execute the present invention.

When an embodiment of the present invention is embodied by firmware or software, firmware or software may be configured in the form of a module, a procedure, a function, etc. which perform function or operations according to the present invention. Firmware or software configured to implement the present invention may be included in the processors 155 and 180 or stored in the memories 160 and 185 and driven by the processors 155 and 180.

Layers of a wireless interface protocol between wireless communication systems (network) of the UE 110 and the BS 105 may be classified into a first layer L1, a second layer L2, and a third layer L3 based on three lower layers of an open system interconnection (OSI) model that is well known in a communication system. A physical layer belongs to the first layer L1 and provides an information transfer service through a physical channel. A radio resource control (RRC) layer belongs to the third layer (L3) and provides control radio resources between the UE 110 and a network. The UE 110 and the BS 105 may exchange RRC messages through a wireless communication network and an RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

Figure 3:
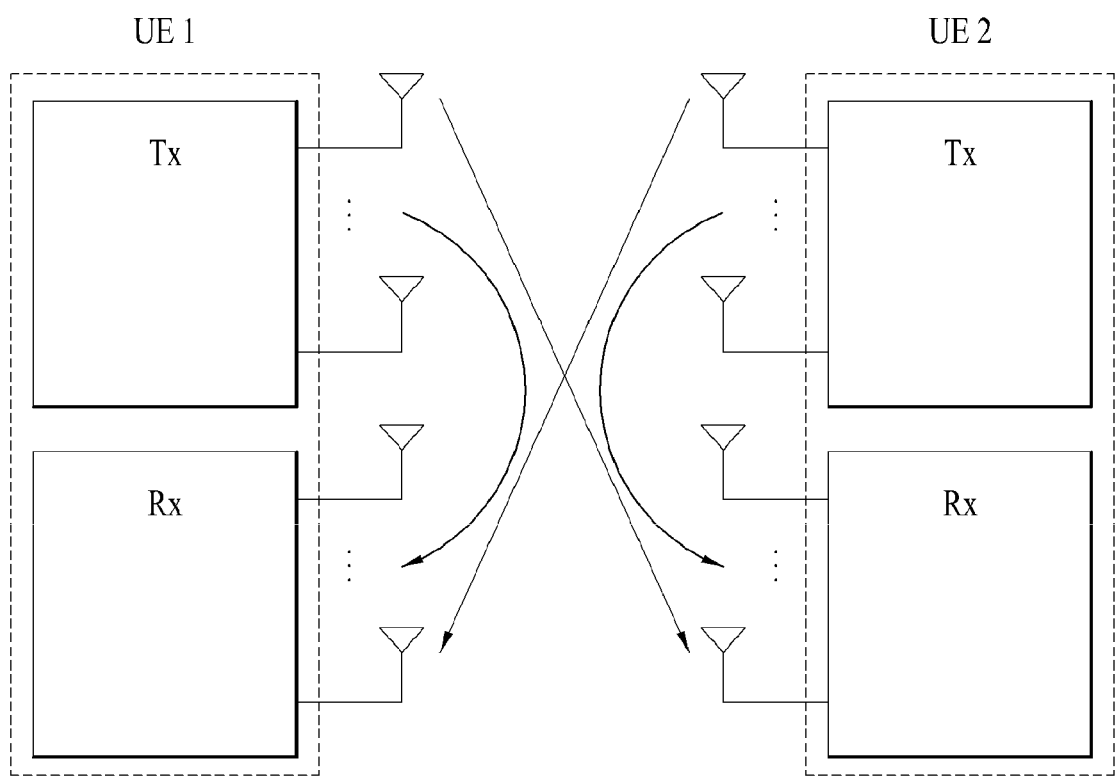
FIG. 3 is a diagram illustrating concept of self interference.

FIG. 3 is a diagram illustrating concept of self interference.

As illustrated in FIG. 3, a signal transmitted from a UE is received by an Rx antenna of the UE and acts as interference. This interference has different characteristic from other interferences. According to the first characteristic, a signal that acts as interference may be considered as a completely known signal. According to the second characteristic, power of a signal that acts as interference is very high compared with a desired signal. Due to this point, even if a signal that acts as interference is completely known, the interference cannot be completely cancelled at a receiver. The receiver uses an analog to digital converter (ADC) in order to convert a signal received by the receiver into a digital signal. In general, the ADC measures power of a received signal, adjusts a power level of the received signal according to the measured power, quantizes the received signal, and then, converts the signal into a digital signal. However, since an interference signal is received with higher power than a desired signal, the signal characteristic of the desired signal is covered by a quantization level during the quantization, and thus, the signal cannot be recovered.

Figure 4:
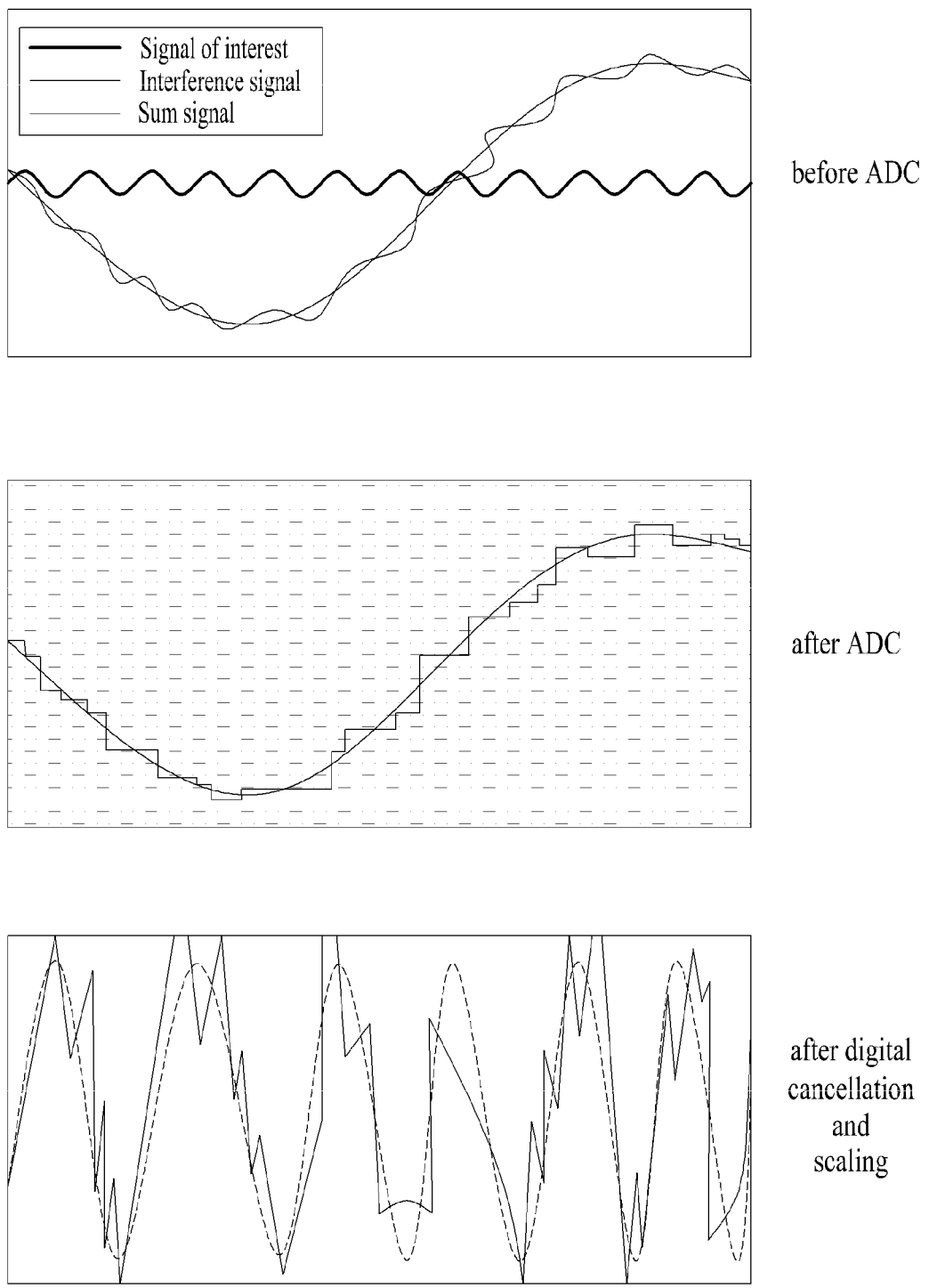
FIG. 4 is a diagram illustrating signal distortion due to quantization errors and FIG. 5 is a diagram illustration signal recovery when quantization errors are low.
Figure 5:
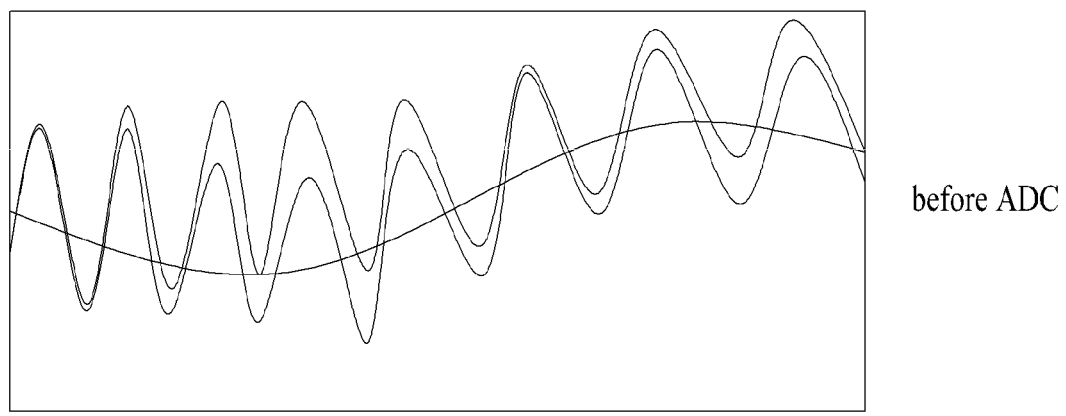
Figure 5:
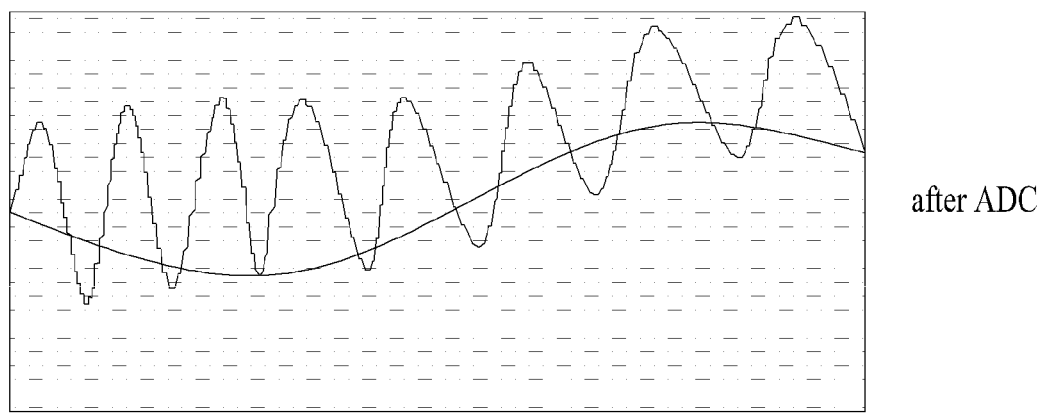
Figure 5:
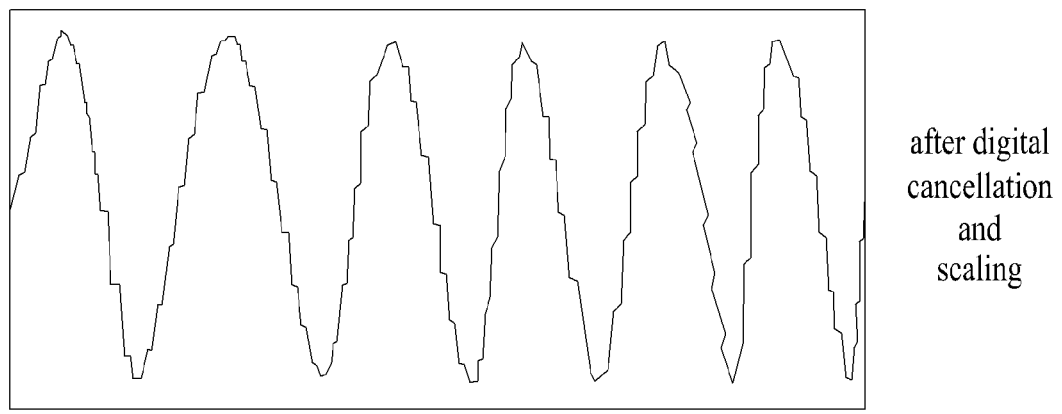

FIG. 4 is a diagram illustrating signal distortion due to quantization errors. FIG. 5 is a diagram illustration signal recovery when quantization errors are low.

In FIG. 4, for example, quantization is assumed to be 4 bits. As seen from FIG. 4, when an interference signal has much higher power than a desired signal, if quantization is performed, even if the interference signal is cancelled, the desired signal is highly distorted. On the other hand, FIG. 5 shows an example in which an interference signal has lower power than a desired signal and the desired signal is recovered after the interference signal is cancelled. In this situation, a scheme for cancelling self-interference may be classified into 4 schemes according to a position in which the scheme is performed.

Figure 6:
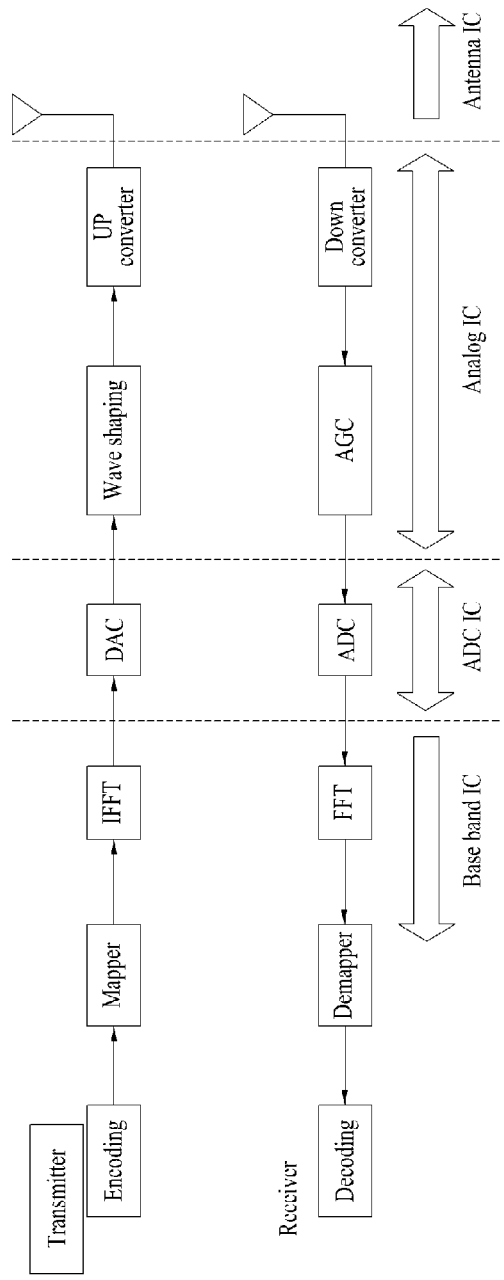
FIG. 6 is a diagram for explanation of a scheme for cancelling self-interference.

FIG. 6 is a diagram for explanation of a scheme for cancelling self-interference.

Referring to FIG. 6, the scheme for cancelling self-interference may be classified into 4 schemes of a baseband IC scheme, an ADC IC scheme, an analog IC scheme, and an antenna IC scheme according to a position in which the scheme is performed.

Figure 7:
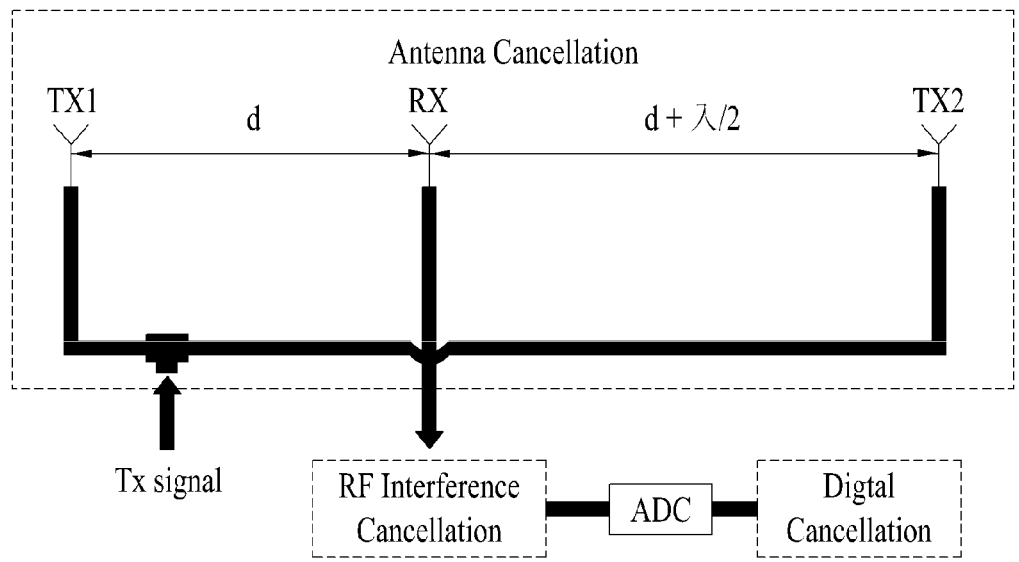
FIG. 7 is a diagram for explanation of an antenna interference cancellation (IC) scheme using a distance between antennas.

FIG. 7 is a diagram for explanation of an antenna IC scheme using a distance between antennas.

The antenna IC scheme can be implemented via a simplest method among all IC schemes and can be performed as shown in FIG. 7. That is, one UE cancels interference using three antennas and uses two antennas as a Tx antenna and one antenna as an Rx antenna among the three antennas. The two Tx antennas are installed at a distance difference corresponding to about wavelength/2 based on the Rx antenna in order to receive a signal transmitted from each Tx antenna as a signal, a phase of which is inversed, in terms of the Rx antenna. Accordingly, an interference signal among signals that are lastly received by the Rx antenna converges toward 0. Alternatively, in order to inverse a phase of a second Tx antenna, an interference signal can be cancelled using a phase shifter as illustrated in FIG. 8 without using a distance between antennas as illustrated in FIG. 7.

Figure 8:
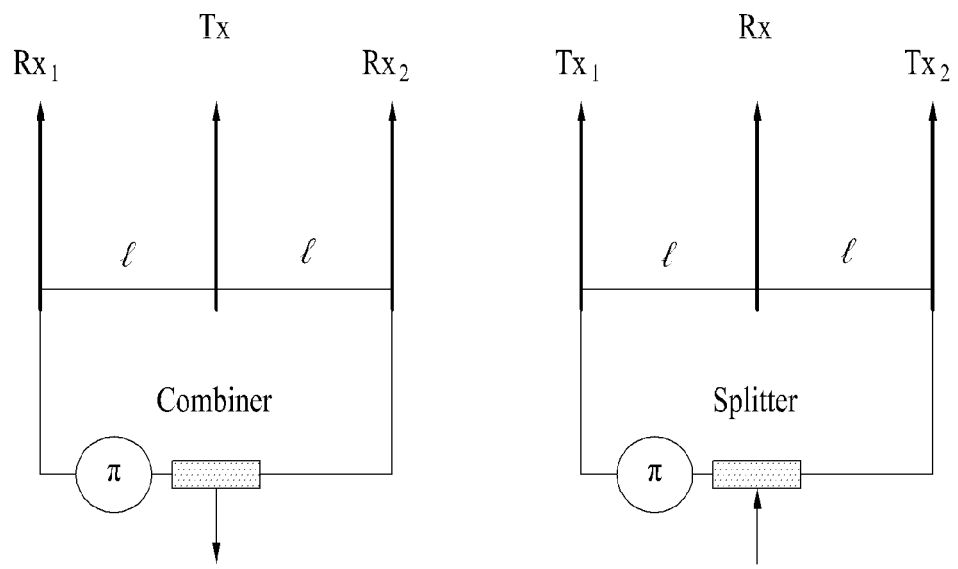
FIG. 8 is a diagram for explanation of an antenna IC scheme using a phase shifter.

FIG. 8 is a diagram for explanation of an antenna IC scheme using a phase shifter.

Figure 9:
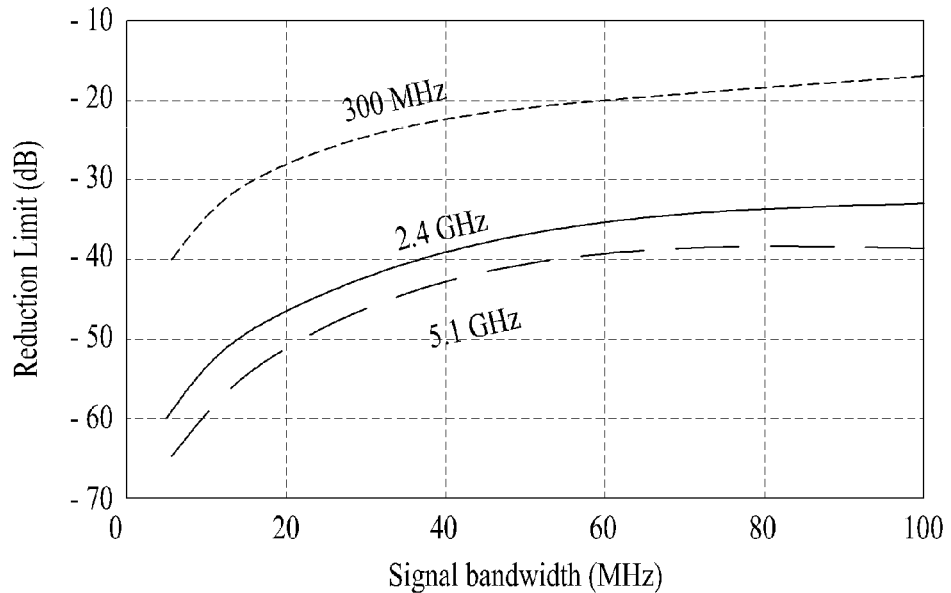
FIG. 9 illustrates interference cancelling performance according to a bandwidth and center frequency of a signal.

In FIG. 8, a left diagram illustrates a scheme for cancelling self-interference using two Rx antennas and a right diagram illustrates a scheme for cancelling interference using two Tx antennas. These antenna interference cancelling schemes are affected by a bandwidth and center frequency of a transmitted signal. As a bandwidth of a transmitted signal is reduced and a center frequency of the transmitted signal is increased, interference cancelling performance is more strengthened. FIG. 9 illustrates interference cancelling performance according to a bandwidth and center frequency of a signal. As illustrated in FIG. 9, as a bandwidth of a transmitted signal is reduced and a center frequency of the transmitted signal is increased, interference cancelling performance is more strengthened.

An ADC IC scheme will now be described. The ADC IC scheme refers to a technology for easily cancelling interference by maximizing the performance of an ADC that has a most serious problem in that interference cannot be cancelled even if an interference signal is pre-known. Although it is disadvantageous in that the ADC IC scheme cannot be applied due to quantization bit limitation of the ADC for actual embodiment, self-interference cancellation performance required by a trend of gradually improving ADC performance may be lowered.

An analog IC scheme will now be described. The analog IC scheme is a scheme for cancelling interference prior to an ADC and cancels self-interference using an analog signal. The analog IC scheme may be performed in a radio frequency (RF) region or performed in an IF region. Interference is cancelled simply by phase and time-lagging a transmitted analog signal and subtracting the analog signal from a signal received by an Rx antenna. The analog IC scheme is advantageous in that only one Tx antenna and one Rx antenna are required unlike the antenna IC scheme. However, since processing is performed using an analog signal, distortion may further occur due to complex implementation and circuit characteristic, thereby highly changing interference cancellation performance.

A digital IC scheme will now be described. The digital IC scheme refers to a scheme for cancelling interference after an ADC and includes any interference cancelation performed in a base band region. As a simplest scheme is embodied by subtracting a transmitted digital signal from a received digital signal. Alternatively, a UE or BS that transmits signals using multi antennas may perform beamforming or precoding so as not to receive the transmitted signal by an Rx antenna. In this regard, when these schemes are performed in a base band, these schemes may also be classified as digital IC. However, the digital IC is possible when a signal modulated in a digital form is quantized so as to recover information about a desired signal. Accordingly, the digital IC is disadvantageous in that an amplitude difference of signal power between a desired signal and an interference signal obtained by cancelling interference via one or more scheme among the above schemes needs to be within an ADC range in order to perform the digital IC.

Figure 10:
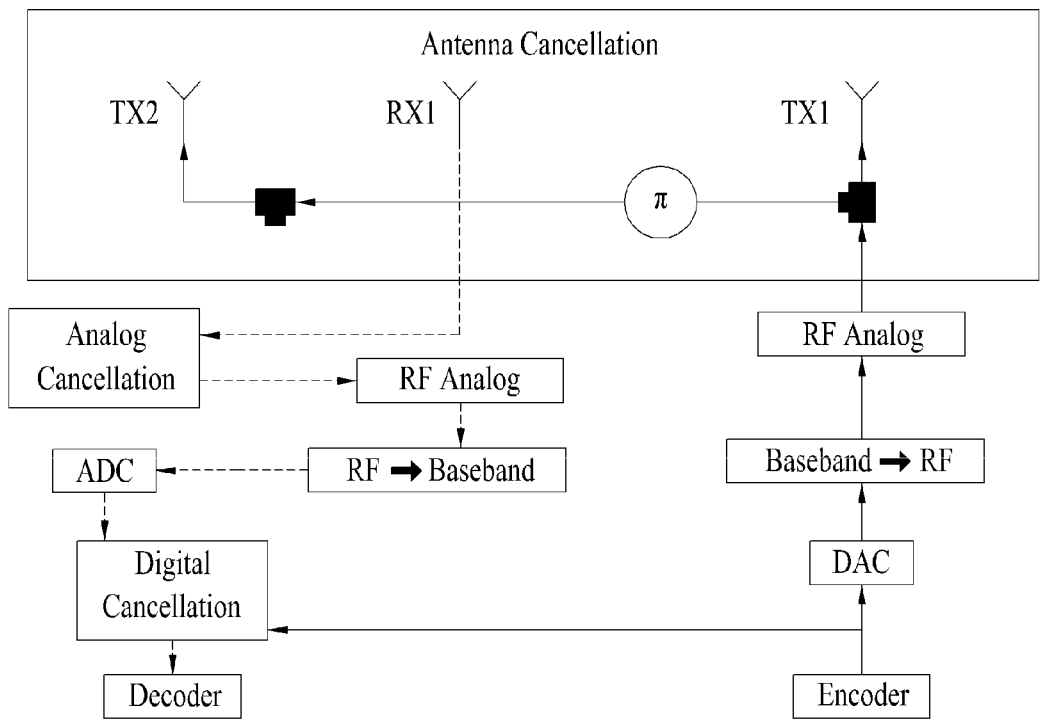
FIG. 10 is a diagram illustrating a system obtained by combining interference cancellation (IC) schemes.

FIG. 10 is a diagram illustrating a system obtained by combining interference cancellation (IC) schemes.

The system illustrated in FIG. 10 is a system to which the above schemes are simultaneously applied and overall interference cancellation performance is improved by combining interference cancellation schemes of respective regions. A scheme proposed according to the present invention proposes a series of procedures and frame structure for cancelling self-interference via a simplest antenna IC scheme among the above schemes and improving overall cell throughput. However, when all of the analog, ADC, and digital IC schemes as well as the antenna IC schemes are applied, even if the scheme proposed according to the present invention, cell throughput may also be improved.

General analog cancellation is achieved via a subtraction method prior to a low noise amplifier (LNA) of a receiver using a signal after a power amplifier (PA) of a transmitter. This is because influence of a signal received by an actual antenna can be effectively reflected only when the signal is extracted from a last node of the transmitter.

Figure 11:
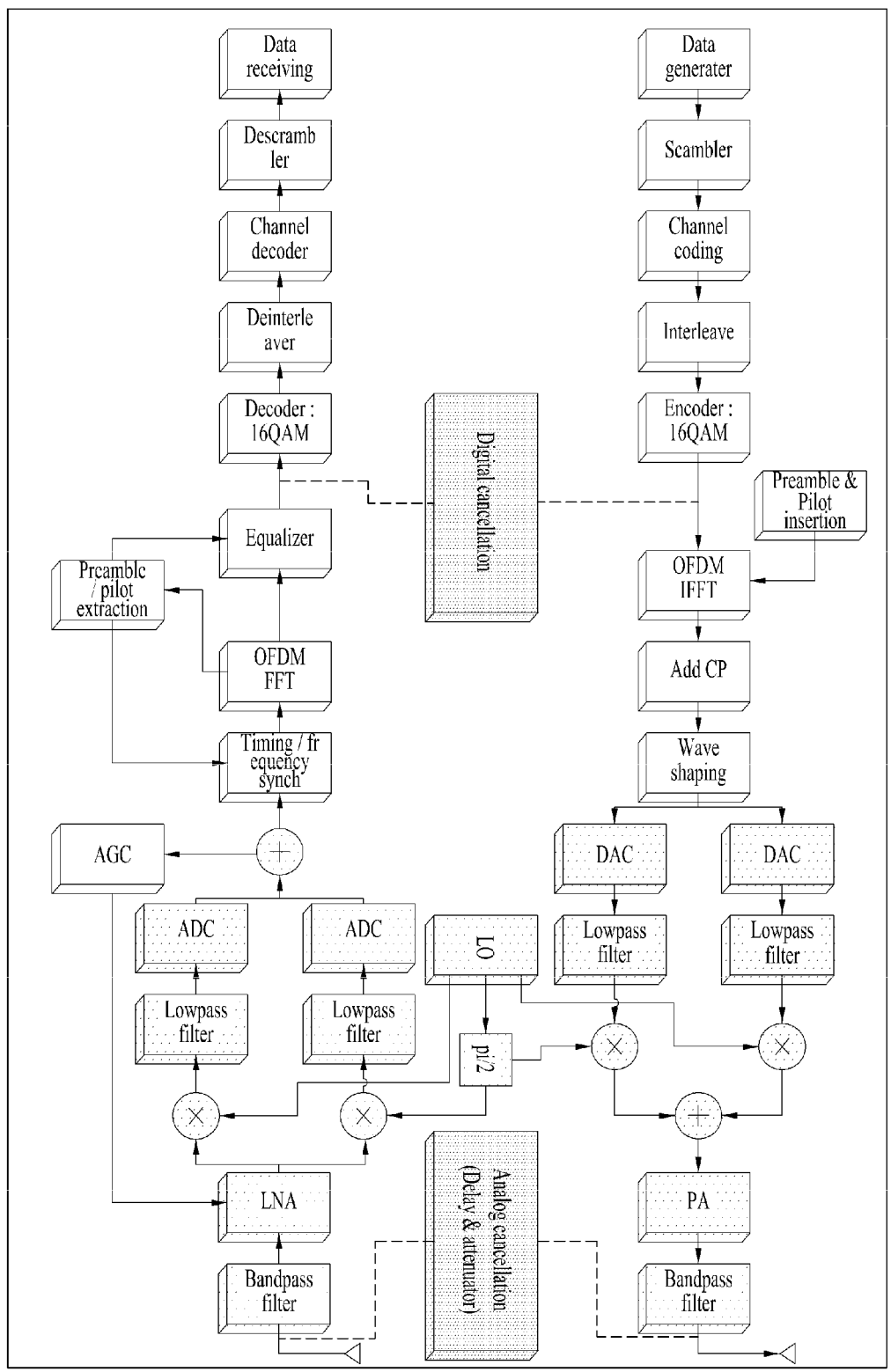
FIG. 11 is a block diagram for interference cancellation in an environment in which orthogonal frequency division multiplexing (OFDM) is used.

FIG. 11 is a block diagram for interference cancellation in an environment in which orthogonal frequency division multiplexing (OFDM) is used.

In the block diagram of FIG. 11, functional blocks according to their purposes may be added or omitted. In addition, a digital cancellation block may be located after an IFFT unit. However, digital cancellation may be performed directly using a digital signal before a DAC and after an ADC or performed using a signal before an FFT and after an IFFT. In addition, FIG. 11 is a conceptual diagram for separating a Tx antenna and an Rx antenna and cancelling a self-interference signal, but an antenna configuration may be changed when FDR is possible using one antenna.

A conventional analog cancellation scheme uses an attenuator and a delay device in order to reflect channel characteristic (time delay and size/phase change until an actual RF signal is output from a Tx antenna and is received by an Rx antenna) between a Tx antenna and an Rx antenna. However, when an analog signal is manipulated using only the attenuator and the delay device, only linear influence can be reflected. This is because it is assumed that antenna characteristic and channel characteristic are linear. Frequency characteristic of an antenna is defined as an S parameter.

Figure 12:
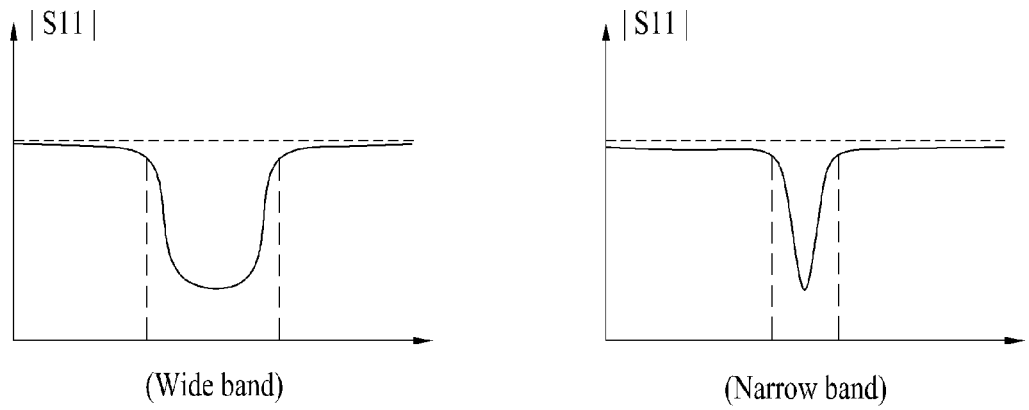
FIG. 12 is a diagram illustrating S parameter characteristic of an antenna for a frequency.

FIG. 12 is a diagram illustrating S parameter characteristic of an antenna for a frequency.

In FIG. 12, a signal is radiated in a region with S11, the size of which is small. That is, when an antenna having wideband characteristic is designed, the antenna has small S11 in a wide region as illustrated in FIG. 12, and when an antenna having narrow characteristic is designed, the antenna has very sharp S parameter characteristic.

Figure 13:
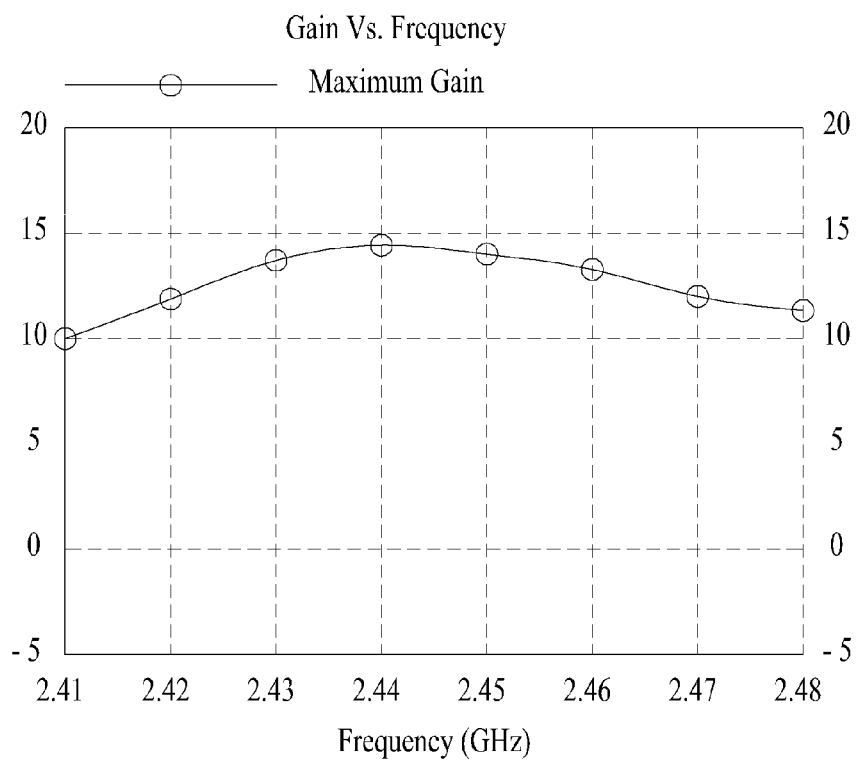
FIG. 13 is a diagram illustrating frequency versus antenna gain characteristic.

In reality, when an antenna is physically designed, frequency versus antenna gain characteristic may be achieved as illustrated in FIG. 13. FIG. 13 is a diagram illustrating frequency versus antenna gain characteristic.

As illustrated in FIG. 13, a narrowband wireless communication system transmits a signal in a narrow frequency region and thus, it may be determined that frequency versus antenna gain is linear. However, when a signal is transmitted in a wide band, antenna gain forms a curve shape and each frequency has nonlinear gain, and thus, nonlinear characteristic may be considered. In addition, the nonlinear characteristic of antenna gain may deepen according to an antenna configuration method or when the antenna has directivity. Thus, there is a need for an analog cancellation scheme that considers the nonlinear characteristic of a radio channel and antenna after a power amplifier (PA).

Figure 14:
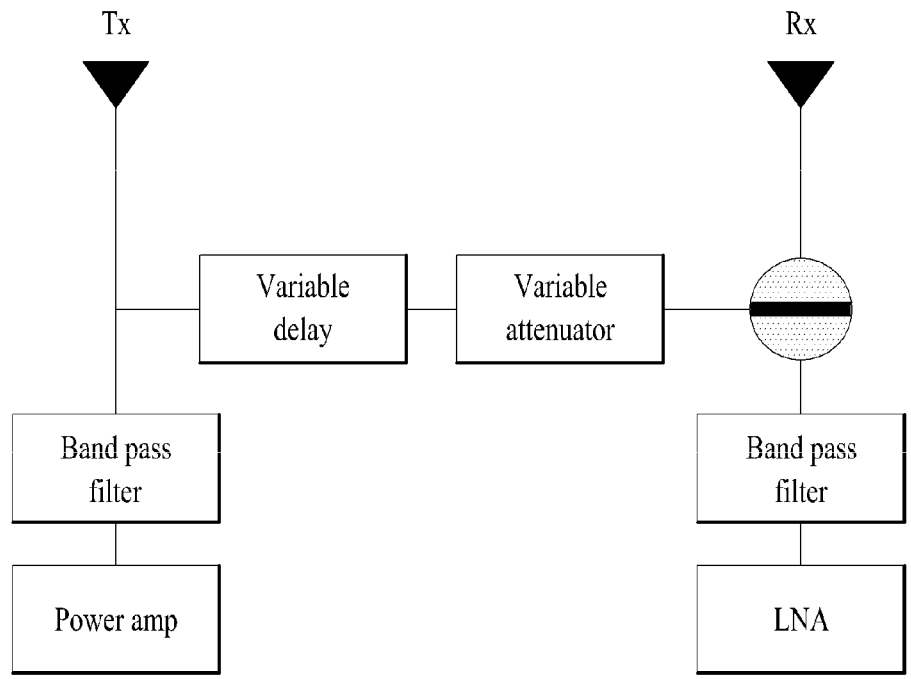
FIG. 14 is a diagram illustrating an example of an analog cancellation scheme.

FIG. 14 is a diagram illustrating an example of an analog cancellation scheme.

In general, analog cancellation may be described with reference to FIG. 14. That is, an analog cancellation unit divides a signal output from a transmitter, equalizing the signal and a self-interference signal using a variable delay unit and variable attenuator for reflecting influence of attenuation and time taken to receive a signal transmitted from a Tx antenna by an Rx antenna, and then subtracts the self-interference signal at a receiver prior to an LNA. In this case, a system may be designed without using a band pass filter of a transmitter and a receiver due to system purpose. In addition, any scheme for generating the same signal as a self-interference signal using a plurality of fixed delay units and a variable attenuator may also be included and applied to the scheme proposed according to the present invention.

However, since the delay device and the attenuator are linear devices, the delay device and the attenuator cannot reflect nonlinear characteristic. Accordingly, the present invention proposes an analog cancellation scheme for forming the same signal as a self-interference signal and subtracting the self-interference signal to have excellent performance compared with a conventional scheme by an analog cancellation unit in consideration of the nonlinear characteristic of an antenna and a radio channel.

When an input signal is distorted due to a nonlinear device, an output signal may be represented in the form of Taylor series or power series according to Expression 1 below.

$$y(t) = \sum_{k=1}^{\infty} b_k x(t)|x(t)|^{(k-1)}$$ [Expression 1]

In this case, x(t) is an input signal, y(t) is an output signal, $b_k$ is a random constant, k is a degree, and t is time.

Alternatively, the output signal may be represented in the form of Volterra series. In this case, the output signal may be represented in the sum of the set of Expression 1 for random time q. Here, influence of memory effect can also be considered. Through this, nonlinear gain to a frequency can be effectively modeled and can be represented according to Expression 2 below.

$$y(t) = \sum_{q=0}^{\infty} \sum_{k=1}^{\infty} b_{q,k} x(t-q)|x(t-q)|^{(k-1)}$$ [Expression 2]

Here, x(t) is a signal that passes through a band pass filter at a transmitter, that is, an input signal before being transmitted through an antenna at the transmitter. Assuming that the aforementioned nonlinear characteristic of the antenna and radio channel is lower than linear characteristic, $b_k$ is reduced as k is increased. Accordingly, a degree up to infinity does not have to be considered. In addition, in general, the degree may be considered up to third to seventh degrees. In addition, when symmetric characteristic of an input signal is ensured, Expression 3 below may be obtained in consideration of only an odd number among degrees for generating an output signal (although the proposed scheme is not limited to the case in which only an odd number is considered as a degree, only an odd number is considered for convenience of description.).

$$y(t) = \sum_{k=1}^{K} b_k x(t)|x(t)|^{2(k-1)}$$ [Expression 3]

where K is a random natural number.

Alternatively, when the output signal is represented in the form of Volterra series, Expression 4 below can be achieved. In this case, Q refers to a random natural number including 0.

$$y(t) = \sum_{q=0}^{Q} \sum_{k=1}^{K} b_{q,k} x(t-q)|x(t-q)|^{2(k-1)}$$ [Expression 4]

Figure 15:
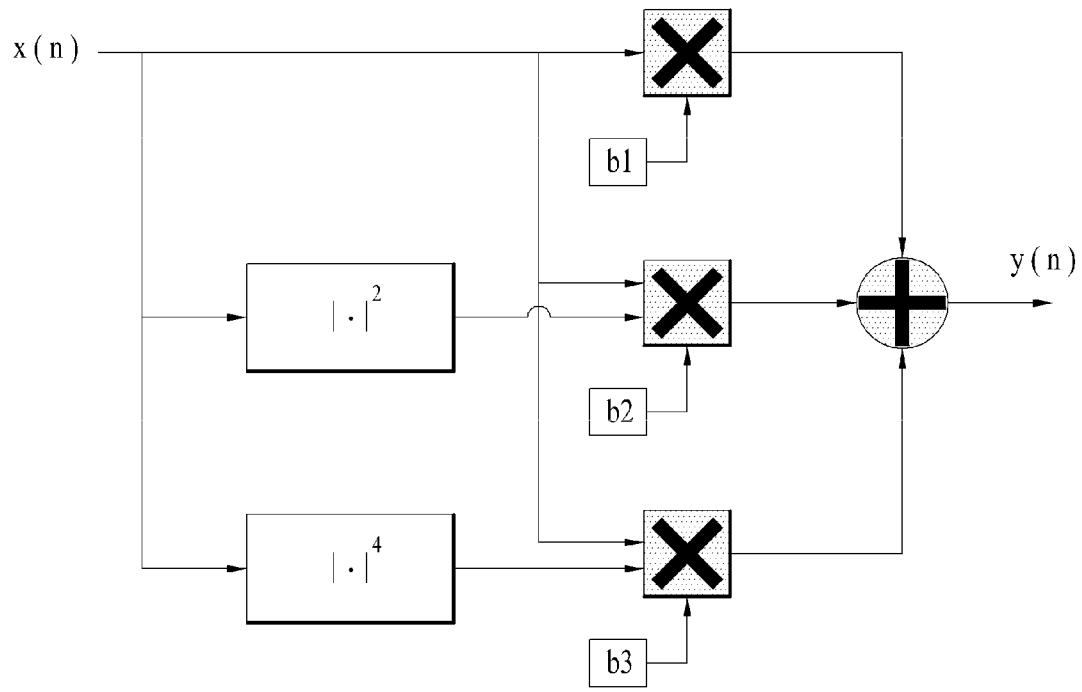
FIG. 15 is a block diagram for reflection of nonlinear distortion characteristic.

Accordingly, blocks of FIG. 15 may be configured to generate and subtract the same signal as a self-interference signal that is distorted due to the nonlinear characteristic of an antenna and radio channel.

FIG. 15 is a block diagram for reflection of nonlinear distortion characteristic.

FIG. 15 illustrates components of an analog cancellation unit as blocks. In FIG. 14, the analog cancellation unit is formed between a node before a signal passes through a band pass filter via a power amplifier (PA) and then is output through an antenna at a transmitter and a node prior to the band pass filter before the signal passes an Rx antenna at a receiver. In FIG. 15, only a degree corresponding to an odd number is considered in order to reflect nonlinear distortion and only third and fifth degrees are considered. In FIG. 15, an operation part $|.|^2$ represents squaring of an input signal x(n) and an operation part $|.|^4$ represents 4 squaring of an input signal x(n).

Figure 16:
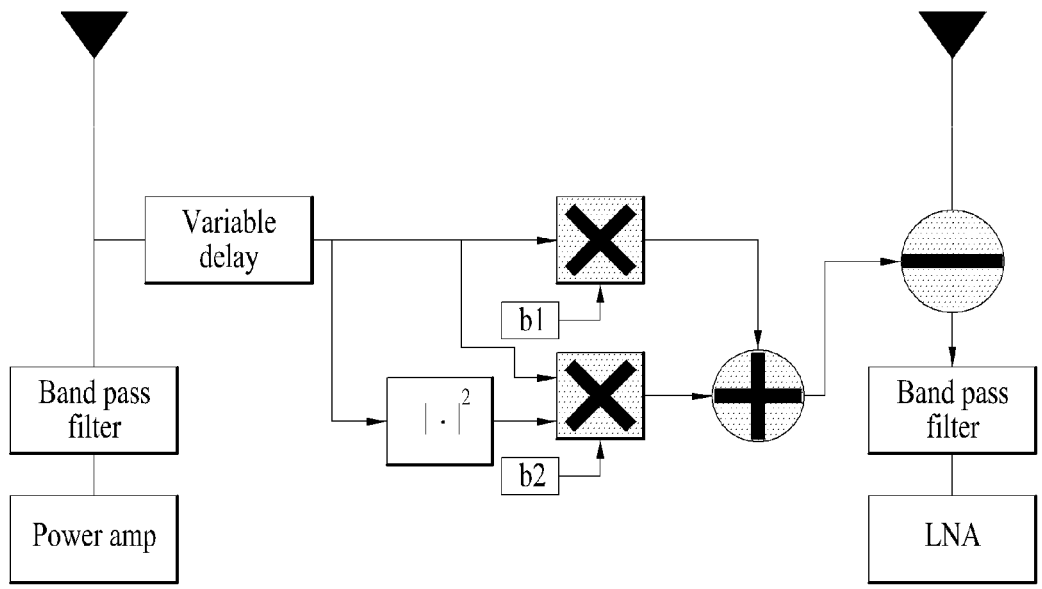
FIG. 16 is a diagram illustrating an analog cancellation scheme that considers nonlinear characteristic of a self-interference signal according to the present invention.
Figure 17:
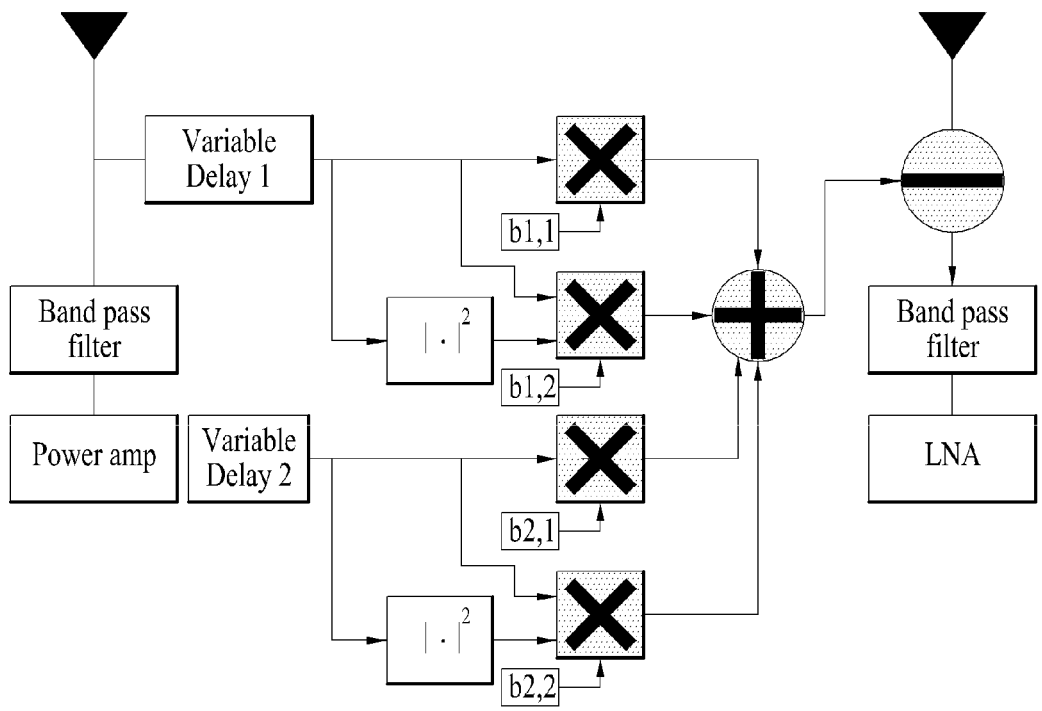
FIG. 17 is a block diagram illustrating an example of an analog cancellation scheme and illustrates the case in which the analog cancellation scheme is extended, Q=2, and K=2.

In addition, when a degree of a seventh degree or more or an even number is considered, blocks may be configured by adding the degrees of FIG. 15. When these blocks are applied to an analog cancellation scheme for cancelling self-interference, the corresponding cases may be represented according to the following diagrams. FIGS. 16 and 17 illustrate the case in which up to the tertiary nonlinear characteristics of an antenna and a radio channel are considered.

FIG. 16 is a diagram illustrating an analog cancellation scheme that considers nonlinear characteristic of a self-interference signal according to the present invention. FIG. 17 is a block diagram illustrating an example of an analog cancellation scheme and illustrates the case in which the analog cancellation scheme is extended, Q=2, and K=2.

Referring to FIG. 17, although FIG. 17 illustrates a variable delay device, a fixed delay device can be used for reduction of complexity. When the fixed delay device is used, the amount of fixed delay is calculated so as to include an average value of a delay value of experimentally measured average self-interference. For example, when two fixed delays are used, an average delay value of self-interference is $\tau$, a delay value of fixed delay 1 may be set to be slightly smaller than $\tau$ and a delay value of fixed delay 2 may be set to be lightly greater than $\tau$.

Referring to FIG. 16, in order to calculate $b_1$ to $b_k$, a preamble or pilot signal that is known between a transmitter and a receiver may be used. However, since a self-interference signal is generated in one device, any signal output to a Tx antenna, such as a data signal as the preamble or pilot signal may be used as the preamble or pilot signal. When $\phi_k(x) = |x|^{2(k-1)} x$ is defined, Expression 5 below may be obtained.

$$y(t) = \sum_{k=1}^{K} b_k \phi_k(x(t))$$ [Expression 5]

When Expression 5 above is represented in the form of matrix, Expression 6 below may be obtained.

$\phi_k(x) = [\phi_k(x(t_1)) \phi_k(x(t_2)) \ldots \phi_k(x(t_N))]^T$ $\phi(x) = [\phi_1(x) \phi_2(x) \ldots \phi_K(x)]$ $y = \phi b$ [Expression 6]

Accordingly, in order to calculate a value 'b', pseudo-inverse may be used.

$b = (\phi^H \phi)^{-1} \phi^H y$

When the pseudo-inverse is calculated, the complexity of hardware may be seriously increased. Accordingly, an optimum coefficient $b_k$ may be calculated via an iteration method. That is, $b_k$ may be changed step-wise for a predetermined training period and an optimum value may be obtained using a difference between a transmitted signal and a received signal. This structure may be represented as illustrated in FIG. 18.

Although not illustrated in FIG. 16, an analog cancellation unit may further include a phase shifter that performs phase shift on a signal output from a variable delay unit. Then signals that pass through the phase shifter pass through the operation part $|.|^2$ and a multiplier (x). When the phase shifter is added, the characteristic of nonlinear phase change of an antenna and radio channel may be well cancelled.

Figure 18:
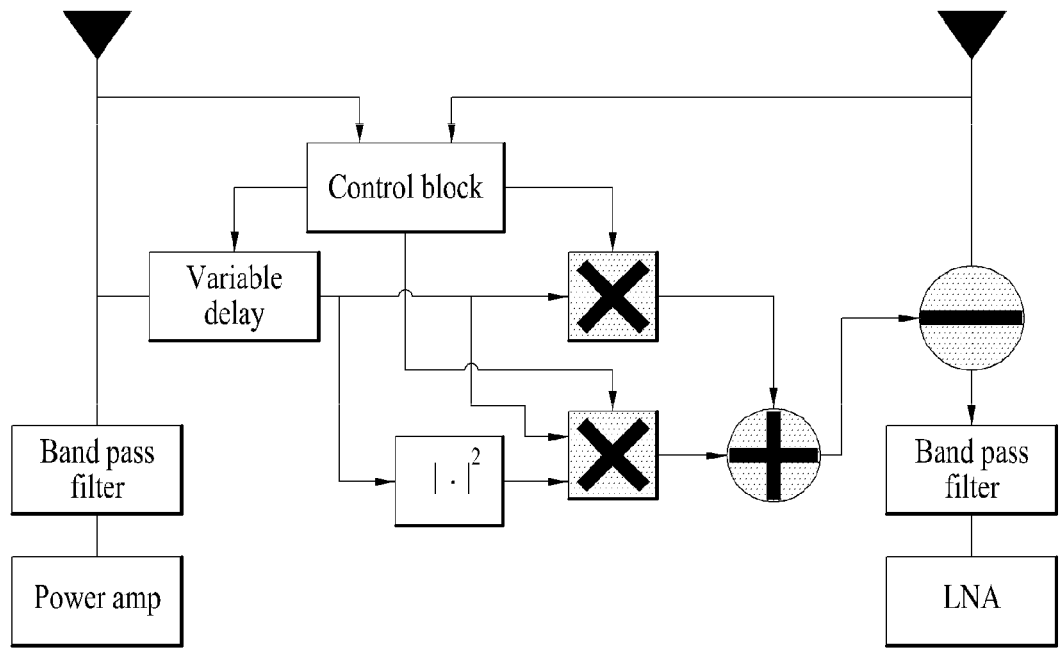
FIG. 18 is a diagram illustrating an analog cancellation scheme that considers nonlinear characteristic of a self-interference signal according to the present invention.

FIG. 18 is a diagram illustrating an analog cancellation scheme that considers nonlinear characteristic of a self-interference signal according to the present invention.

As illustrated in FIG. 18, an analog cancellation unit may further include a control block for calculating a variable delay value and a value $b_k$. In FIG. 18, the control block may calculate an optimum delay value and coefficient by comparing a transmitted signal and a received signal using a pseudo-inverse scheme or an iteration scheme as a calculation method. Alternatively, a look up table (LUT) may be used for convenience of implementation.

Figure 19:
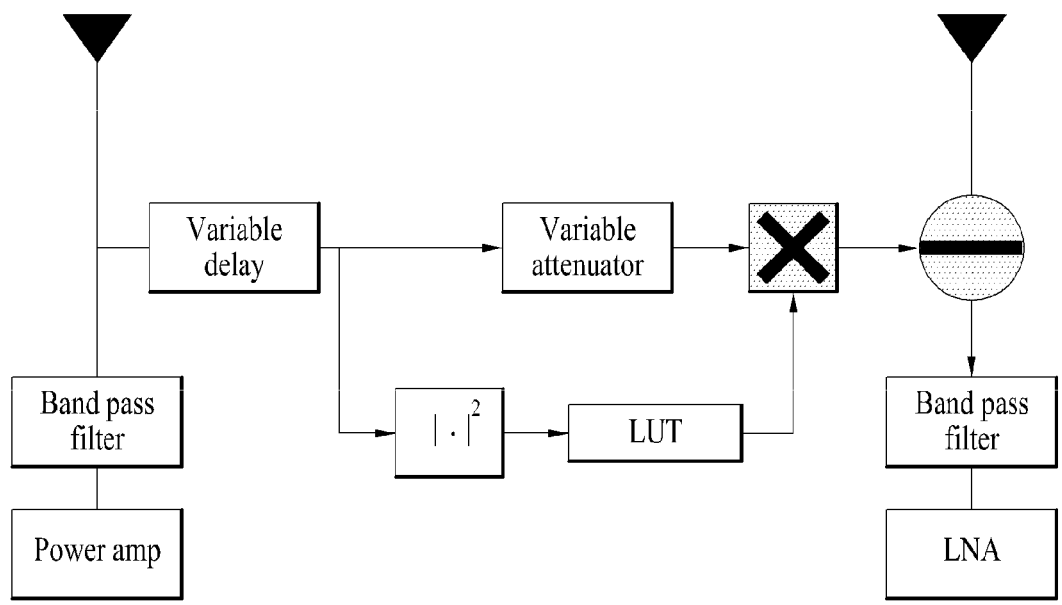
FIG. 19 is a diagram illustrating an analog cancellation scheme that considers nonlinear characteristic of a self-interference signal according to the present invention.

FIG. 19 is a diagram illustrating an analog cancellation scheme that considers nonlinear characteristic of a self-interference signal according to the present invention.

FIG. 19 illustrates an example using a look up table (LUT). As illustrated in FIG. 19, analog cancellation may be performed in consideration of nonlinear characteristic by mapping an optimum coefficient corresponding to a degree to a size corresponding to square of an input signal according to a table and outputting a response value of the optimum coefficient.

In FIG. 19, a high degree method may also be embodied via parallel use of a look up table (LUT) in a method or scheme that considers degrees up to a third degree only, and the control block used in FIG. 19 may be additionally used in order to adjust values of the LUT.

In FIG. 19, an analog cancellation unit is configured by assuming that a signal output from a Tx antenna is received by an Rx antenna along a single path. However, since a signal output to the Tx antenna is also received by the Rx antenna along a multi-path, influence due to the multi-path needs to be reflected. When a signal is received along a multi-path, the analog cancellation unit configured in FIG. 19 may be added in parallel between a transmitter and a receiver at each path. The analog cancellation unit may be added according to the multi-path, which may be applied to the block diagrams illustrated in FIGS. 14 and 17 as well as in FIG. 19.

An object of the aforementioned scheme proposed according to the present invention is to completely recover a self-interference signal in consideration of nonlinear characteristic of an antenna and radio channel and to improve the usefulness of frequency dependent rejection (FDR) by subtracting a copied signal at a receiver to cancel a self-interference signal.

According to an embodiment of the present invention, a self-interference signal of nonlinear characteristic as well as a self-interference signal of linear characteristic between antennas may be completely cancelled in consideration of nonlinear characteristic of an antenna and radio channel to improve the usefulness of frequency dependent rejection (FDR).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for cancelling a self-interference signal between a transmission antenna and a reception antenna, the apparatus comprising:
   a first self-interference signal cancellation unit for cancelling a self-interference signal in consideration of a linear channel between the transmission antenna and the reception antenna;
   a second self-interference signal cancellation unit for cancelling a self-interference signal in consideration of nonlinear channel characteristic or linear characteristic of a radio channel between the transmission antenna and the reception antenna; and
   a controller for comparing a transmitted signal output from the transmission antenna and a received signal received by the reception antenna to provide a first coefficient to be applied to self-interference signal cancellation of a linear element in the first self-interference signal cancellation unit and a second coefficient to be applied to self-interference signal cancellation of a nonlinear element in the second self-interference signal cancellation unit.

2. The apparatus according to claim 1, wherein the second self-interference signal cancellation unit cancels a self-interference signal of a nonlinear element using the second coefficient.

3. The apparatus according to claim 1, wherein the first self-interference signal cancellation unit cancels a linear self-interference signal in consideration of time taken to receive the transmitted signal by the reception antenna using the first coefficient.

4. The apparatus according to claim 1, wherein the first self-interference signal cancellation unit and the second self-interference signal cancellation unit are configured in series between a receiver comprising the transmission antenna and a receiver comprising the reception antenna.

5. The apparatus according to claim 1, wherein the controller is configured between the transmission antenna and the reception antenna.

6. The apparatus according to claim 1, wherein the first self-interference signal cancellation unit, and the second self-interference signal cancellation unit are connected and configured in series between a node between a band pass filter and a transmission antenna at a transmitter and a node between a band pass filter and a reception antenna at a receiver.

7. A method for cancelling a self-interference signal between a transmission antenna and a reception antenna, the method comprising:
   comparing a transmitted signal output from the transmission antenna and a received signal received by the reception antenna to provide a first coefficient to be applied to self-interference signal cancellation of a linear element and a second coefficient to be applied to self-interference signal cancellation of a nonlinear element;
   cancelling a linear self-interference signal using the first coefficient; and
   cancelling a nonlinear self-interference signal using the second coefficient.

8. The method according to claim 7, wherein the cancelling of the linear self-interference signal comprises cancelling a self-interference signal in consideration of time taken to receive the transmitted signal by the reception antenna using the first coefficient.

* * * * *